United States Patent
Maeda et al.

(10) Patent No.: US 9,026,715 B2
(45) Date of Patent: May 5, 2015

(54) INFORMATION RECORDING DEVICE, INFORMATION RECORDING SYSTEM, AND INFORMATION COMMUNICATION METHOD

(71) Applicant: Panasonic Corporation, Osaka (JP)

(72) Inventors: Takuji Maeda, Osaka (JP); Tatsuya Adachi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 324 days.

(21) Appl. No.: 13/676,558

(22) Filed: Nov. 14, 2012

(65) Prior Publication Data

US 2013/0073781 A1   Mar. 21, 2013

Related U.S. Application Data

(63) Continuation of application No. PCT/JP2012/002715, filed on Apr. 19, 2012.

(30) Foreign Application Priority Data

Jun. 2, 2011   (JP) .................................. 2011-123948

(51) Int. Cl.
*G06F 13/00*   (2006.01)
*G06F 12/00*   (2006.01)
(Continued)

(52) U.S. Cl.
CPC .......... *G06F 12/00* (2013.01); *G06F 17/30123* (2013.01)

(58) Field of Classification Search
CPC ................................................ G06F 17/30123
See application file for complete search history.

(56) References Cited

U.S. PATENT DOCUMENTS 6,434,574 B1 *   8/2002   Day et al. .............................. 1/1
7,310,114 B2 *   12/2007   Yokota ....................... 348/231.3
(Continued)

FOREIGN PATENT DOCUMENTS

| JP | 2000-163295 A | 6/2000 |
|----|---------------|--------|
| JP | 2001-109675 A | 4/2001 |
| JP | 2002-366919 A | 12/2002 |

(Continued)

OTHER PUBLICATIONS

Japanese Office Action for corresponding Japanese Application No. 2012-553887 dated Feb. 25, 2014.
(Continued)

*Primary Examiner* — Eric S Cardwell
(74) *Attorney, Agent, or Firm* — Renner, Otto, Boisselle & Sklar, LLP.

(57) ABSTRACT

An information recording device comprises a memory component configured to hold data, a first file system controller configured to manage data held in the memory component on the basis of a first file name formed by a first code, and a wireless component configured to send and receive wireless signals. The first file system controller receives, from an access device connected to the information recording device, the first file name and a second file name that corresponds to the first file name and is formed by a second code that is different from the first code, identifies specific data having the first file name out of the data held in the memory component, and sends the second file name and the specific data to another information recording device connected via the wireless component.

19 Claims, 13 Drawing Sheets

(51) Int. Cl.
*G06F 13/28* (2006.01)
*G06F 17/30* (2006.01)

(56) References Cited

U.S. PATENT DOCUMENTS

| | | | |
|---|---|---|---|
| 8,839,102 B2 * | 9/2014 | Li et al. ........................ | 715/256 |
| 2003/0122944 A1 | 7/2003 | Yokota | |

FOREIGN PATENT DOCUMENTS

| JP | 2003-198996 A | 7/2003 |
|---|---|---|
| JP | 2003-228502 A | 8/2003 |
| JP | 2004-287854 A | 10/2004 |
| JP | 2004-310371 A | 11/2004 |
| JP | 2006-221336 A | 8/2006 |
| JP | 2009-140063 A | 6/2009 |
| JP | 2010-009214 A | 1/2010 |

OTHER PUBLICATIONS

International Search Report for corresponding International Application No. PCT/JP2012/002715 mailed Jun. 12, 2012.

* cited by examiner

INFORMATION RECORDING DEVICE, INFORMATION RECORDING SYSTEM, AND INFORMATION COMMUNICATION METHOD

TECHNICAL FIELD

The present invention relates to a technique for storing data in a nonvolatile memory and managing it as a file, and for communicating wirelessly with an external device.

BACKGROUND ART

Recording media for recording music content, video data, and other such digital data come in many different forms, such as magnetic disks, optical disks, and opto-magnetic disks. Of these recording media, a memory card in which a flash ROM or other such semiconductor memory is used as a recording element allows the recording medium to be more compact, so such memory cards are rapidly gaining popularity, especially in compact portable devices such as digital still cameras and portable telephone terminals. Recently, semiconductor memories are being used also in applications as built-in storage for devices, and not just applications as removable media such as conventional memory cards. For example, a flash ROM or other such semiconductor memory is built into a device and used instead of a hard disk.

Meanwhile, recent years have seen an increase in public access points that afford connectivity, such as train stations and coffee shops, while the trend toward wireless home networks is rapidly making wireless LAN connection environments more popular. Along with this, devices compatible with a wireless LAN are quickly catching on, along with the numbers and types of terminals, such as portable telephone terminals, tablet terminals, NAS (network attached storage), and HDD recorders, in addition to the notebook personal computers that were the mainstream in the past.

In light of this popularity of wireless LAN, there have been proposed memory cards equipped with a wireless function, in which a wireless function is installed in a conventional memory card (see Patent Literature 1, for example). These memory cards with a wireless function have the same interface shape as a conventional memory card, so the interface can be shared with a host device having a slot for a conventional memory card. Furthermore, memory cards with a wireless function make wireless compatibility possible at low cost, without having to install hardware or software resources for wireless communication on the host device side.

For example, when a memory card is mounted in a digital still camera, in the past the memory card first had to be taken out of the digital still camera and put into a PC or the like to upload still pictures to a Web service or the like. With a memory card having a wireless function, however, the host device can be easily networked, allowing still pictures to be uploaded to a Web service directly from the digital still camera, for example.

Furthermore, installing wireless communication function in a memory card allows direct wireless connection between memory cards, so that file sharing becomes possible. Consequently, a still picture captured at an event such as a sporting event or a wedding can be transferred to others right on the spot, making photograph sharing more convenient.

FIG. 14 shows an overview of file sharing. In file sharing, the first step is that a sending-side host device 30 (such as a digital still camera) notifies a sending-side card 40 (such as a memory card with a wireless function) of transfer destination information and the file name in question, and outputs a file transfer command. The sending-side card 40 then connects to a receiving-side card 41 (such as a memory card with a wireless function) on the basis of the received transfer destination. The sending-side card 40 then detects the file in question on the basis of the received file name, actually reads the file data, and sends the data to the receiving-side card 41. The receiving-side card 41 produces a file upon receiving the file data, and notifies a receiving-side host 31 (such as a digital still camera) that a file has been acquired.

In another method, file reading is carried out by the sending-side host 30, and the read data is sent from the sending-side host 30 to the sending-side card 40, so that processing of the file system is not performed within the sending-side card 40. However, if the configuration as shown in FIG. 14 is applied, in which the reading and sending of files is carried out within the sending-side card 40, there is no need for data transfer between the sending-side host 30 and the sending-side card 40, and file transfer can be faster.

CITATION LIST

Patent Literature

Patent Literature 1: Japanese Laid-Open Patent Application 2002-366919

SUMMARY

Technical Problem

In file sharing, for the sake of management, the file name at the sending side preferably matches the file name on the receiving side. The file name of a still picture captured with a digital still camera is generally given in ASCII code by a specific rule. ASCII is an alphanumeric expressed by 7-bit code. A name in ASCII code is a generic name such as "IMAG0001.JPG," so it is sometimes changed to a name that is easier for the user to recognize, such as "2011 athletic meet0001.JPG."

When a file having a custom name is shared, both the file systems in the sending-side card 40 and the receiving-side card 41 must be able to handle that custom name. With the FAT file system used in general in memory cards, a character code that relies on the locale, such as Shift-JIS, is used as the character code. Therefore, when a custom name is used for a file name, the file system in the card must be compatible with the character code that relies on the locale, such as Shift-JIS. In this case, since the character code in use will vary from one locale to the next, it is necessary either to incorporate character code compatible processing for all locales into the card ahead of time, or to change the character code compatible processing in the card for each locale where the card is sold, and therefore, both of these options impose a heavy burden on card loading.

In light of the above problems, it is an object of the technology disclosed herein to allow file sharing in which custom file names are used.

Solution to Problem

In one aspect of the present invention, an information recording device is provided that comprises a memory component configured to hold data, a first file system controller configured to manage data held in the memory component on the basis of a first file name formed by a first code, and a wireless component configured to send and receive wireless signals. The first file system controller receives, from an access device connected to the information recording device, the first file name and a second file name that corresponds to the first file name and is formed by a second code that is different from the first code, identifies specific data having the first file name out of the data held in the memory component, and sends the second file name and the specific data to another information recording device connected via the wireless component.

In another aspect of the present invention, an information recording device comprises a memory component configured to hold data, a first file system controller configured to manage data held in the memory component on the basis of a first file name formed by a first code, and a wireless component configured to send and receive wireless signals. The first file system controller receives, from another information recording device connected via the wireless component, a second file name formed by a second code that is different from the first code and specific data corresponding to the second file name, acquires the first file name, produces a file having the first file name, records the received specific data to the file having the first file name, and sends the first file name and the second file name to a connected access device.

In yet another aspect of the present invention, there is provided an information recording system, comprising the information recording device according to either of the above aspects, and an access device connected to the information recording device and having a second file system controller configured to manage data held in the memory component of the information recording device.

In yet another aspect of the present invention, there is provided an information communication method using an information recording device having a memory component configured to hold data, a file system controller configured to manage data held in the memory component on the basis of a first file name formed by a first code, and a wireless component configured to send and receive wireless signals.

Advantageous Effects

With the present invention, it is possible to share files using custom file names.

DESCRIPTION OF EMBODIMENTS

The information recording device with wireless function, access device, and information recording system pertaining to embodiments of the present invention will now be described through reference to the drawings.

1. Embodiment 1

1.1 Configuration of Information Recording System 100

Figure 1:
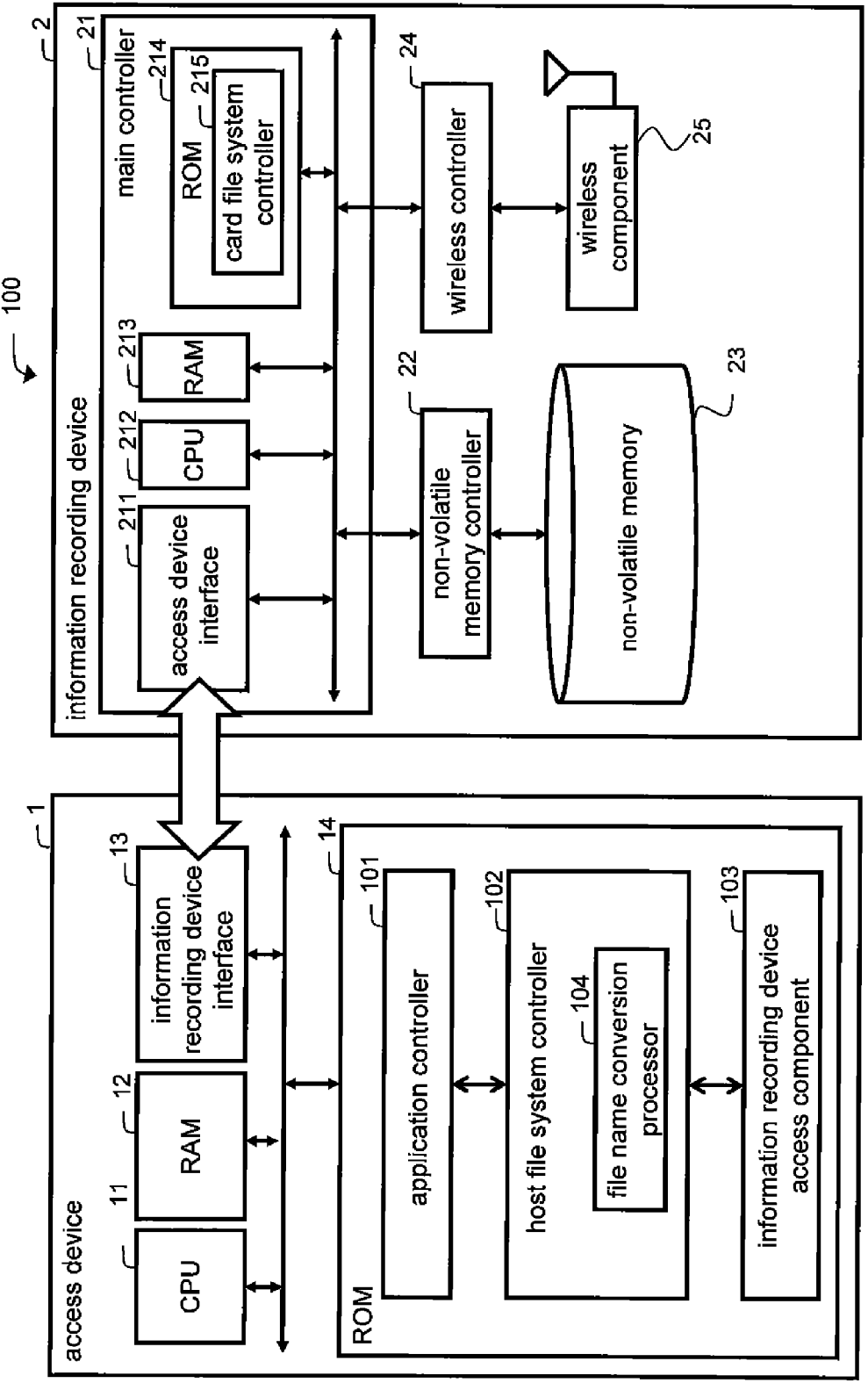
FIG. 1 is a simplified diagram of the configuration of the information recording system with wireless function in Embodiment 1.

FIG. 1 is a simplified diagram of the configuration of the wireless information recording system 100 in Embodiment 1. The information recording system 100 comprises an access device 1 and a wireless information recording device 2.

1.1.1 Access Device 1

In FIG. 1, the access device 1 includes a CPU 11, a RAM 12, an information recording device interface 13, and a ROM 14. The access device 1 is, for example, a device that handles moving pictures, still pictures, or other such digital content, and may be a movie/digital still camera, a portable telephone terminal, a tablet terminal, a PC application, or the like.

The ROM 14 holds a program that controls the access device 1. This program uses the RAM 12 as a temporary memory region, and operates on the CPU 11. The information recording device interface 13 is used to connect the access device 1 with the wireless information recording device 2, and sends and receives control signals and data.

The ROM 14 further includes an application controller 101, a host file system controller 102 (an example of a file system controller or a second file system controller), and an information recording device access component 103. The application controller 101 controls the entire access device 1, such as control over data production and power supply. The host file system controller 102 performs control for managing data as a file with an FAT file system or other such file system.

The information recording device access component 103 is given the data size and the data storage address along with data from the host file system controller 102, and records data of a designated size to a designated location within a volatile memory 23 of the information recording device 2. Thus, the information recording device access component 103 controls the sending and receiving of commands and data to and from the information recording device 2. The information recording device access component 103 also controls the sending and receiving of commands and data related to the control of a wireless component 25 of the information recording device 2.

The host file system controller 102 also includes a file name conversion processor 104. The file name conversion processor 104 is a processor that performs file name conversion processing prior to file transfer and file name restoration processing after file transfer when the name of the file to be shared is in something other than ASCII code, and is not found in a conventional access device. This processor will be discussed in detail below.

1.1.2 Information Recording Device 2

Meanwhile, the information recording device 2 in FIG. 1 includes a main controller 21, a volatile memory controller 22, a volatile memory 23 (an example of a memory component), a wireless controller 24, and a wireless component 25 (an example of a wireless component). The information recording device 2 is, for example, a memory card, a removable medium such as a USB memory, or a built-in recording device that holds digital content or the like.

The main controller 21 is a device that performs overall control of the wireless information recording device 2, and is constituted as a system-on-a-chip that includes a CPU or the like. The main controller 21 also includes an access device interface 211, a CPU 212, a RAM 213, and a ROM 214.

The access device interface 211 is used to connect the information recording device 2 and the access device 1, and is similar to the information recording device interface 13 in that it is an interface for sending and receiving control signals and data. The ROM 214 holds a program that controls the information recording device 2. This program uses the RAM 213 as a temporary memory region, and operates on the CPU 212.

The ROM 214 further includes a card file system controller 215 (an example of a file system controller or a first file system controller). The card file system controller 215 interprets the FAT file system or other such file system constructed on the volatile memory 23, and performs control for reading and writing file data. This processing is in general carried out by the host file system controller 102 in an access device 1. In this embodiment, however, the card file system controller 215, which has the same function, is also provided in a card in order to obtain faster file share processing. This controller will be discussed in detail below.

The volatile memory controller 22 is located between the main controller 21 and the volatile memory 23 and controls the sending and receiving of commands and data to and from the volatile memory 23. Similarly, the wireless controller 24 is located between the main controller 21 and the wireless component 25 and controls the sending and receiving of commands and data to and from the wireless component 25. The wireless component includes an antenna, a circuit, and so forth that make up a short-distance wireless communication interface such as Bluetooth® of a wireless LAN typified by 802.11b, g, and n.

1.2 File Share Processing by Information Recording System 100

Figure 2:
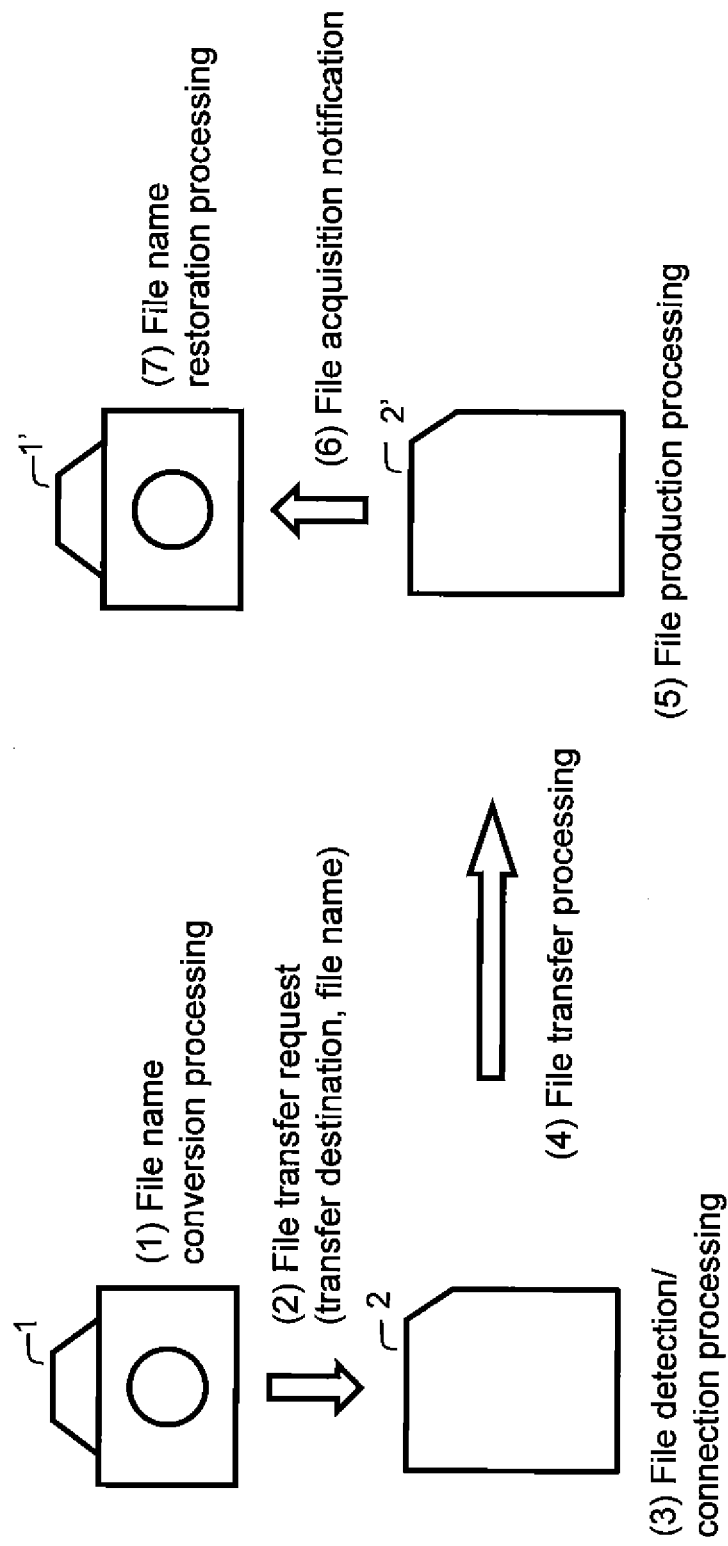
FIG. 2 is a diagram illustrating an overview of file share processing in Embodiment 1.

FIG. 2 is a diagram illustrating an overview of file share processing in Embodiment 1. Reference number 1 in the drawing is a sending-side access device, reference number 2 is a sending-side information recording device, reference number 1' is a receiving-side access device, and reference number 2' is a receiving-side information recording device. In this example, the receiving-side access device 1' has the same configuration and function as the sending-side access device 1, and the receiving-side information recording device 2' has the same configuration and function as the sending-side information recording device 2. Those portions having the same configuration and function on the sending-side and receiving-side will hereinafter be referred to with the same numbering.

Figure 14:
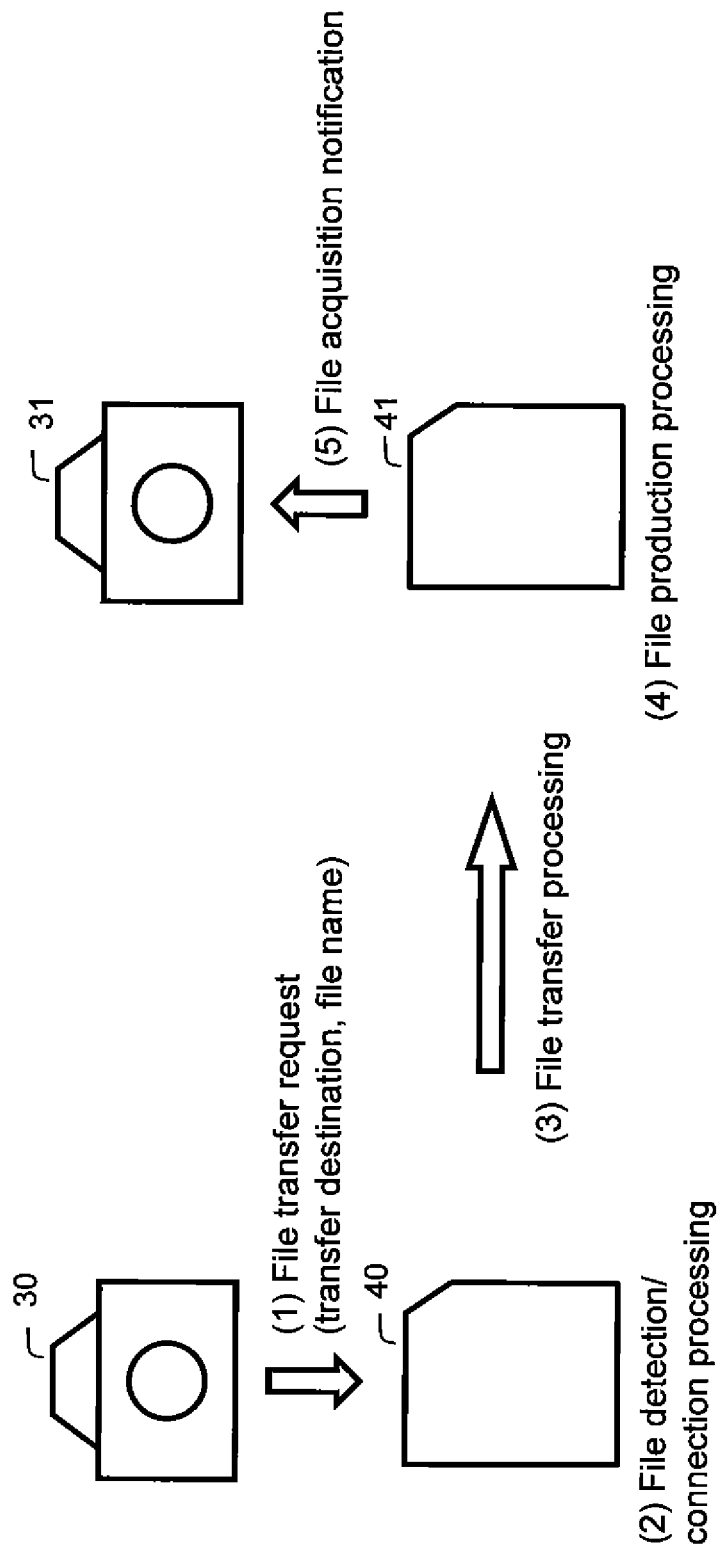
FIG. 14 is a diagram illustrating an overview of conventional file share processing.

This file share processing includes wireless transmission of the file data stored in the sending-side information recording device 2 on the basis of a command from the sending-side access device 1, and confirmation of the file data by the receiving-side access device F. The file share processing shown in FIG. 2 differs from that in FIG. 14 in that the sending-side access device 1 performs file name conversion processing prior to file share processing, and that the receiving-side access device 1' performs file name restoration processing after file share processing. Also, the file name notification method used for the various kinds of processing in FIG. 2 is different from that used in the past. Even when file sharing using a custom file name is performed by addition or modification of these processing steps, it will still be possible to perform file sharing that does not require operation for allowing compatibility with each locale on the information recording device side.

Figure 3:
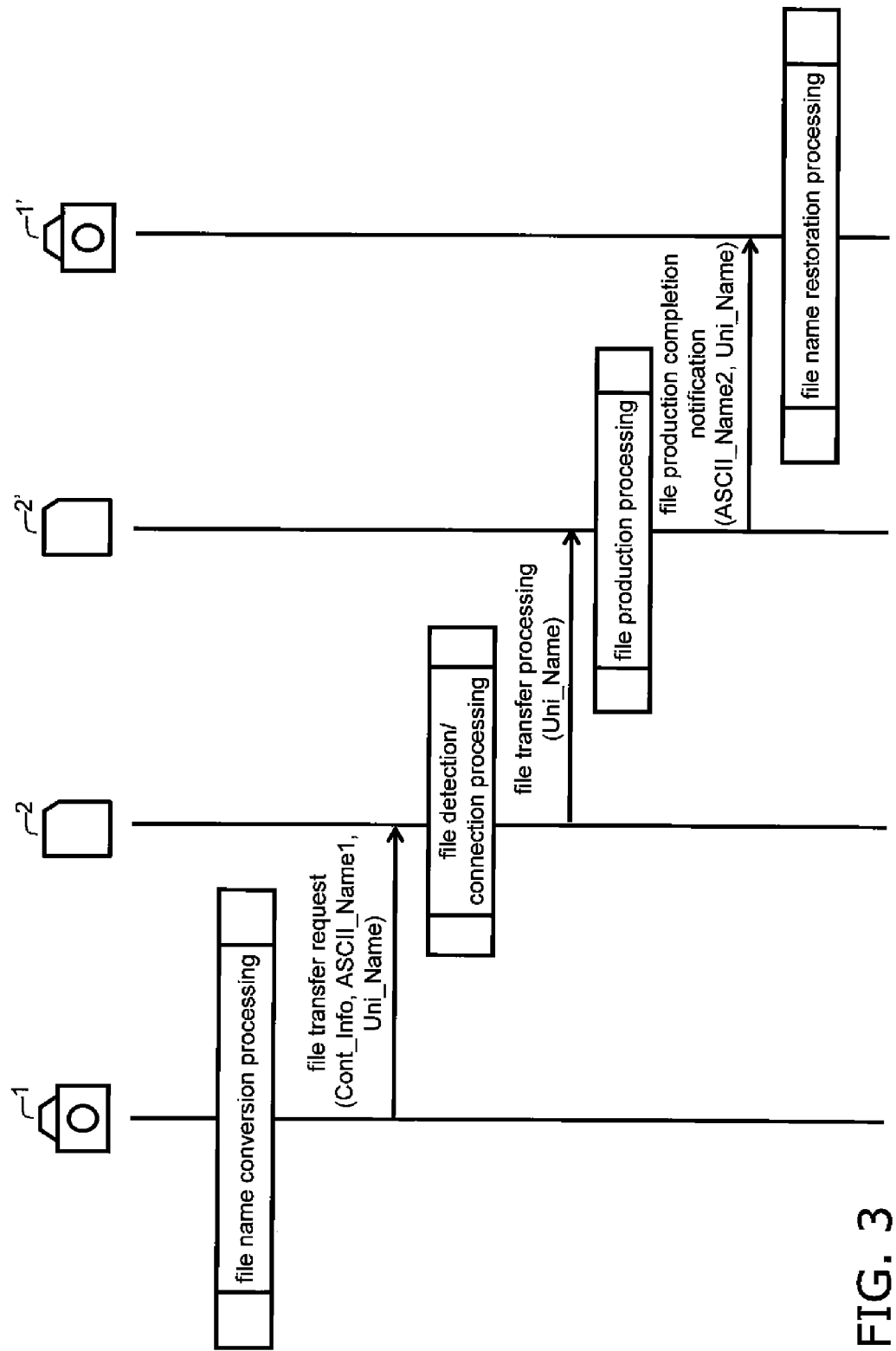
FIG. 3 is a diagram illustrating the file share processing sequence in Embodiment 1.

In FIG. 3, the content of file sharing in Embodiment 1 illustrated in FIG. 2 is given as a sequence. The Cont_Info, ASCII_Name1, Uni_Name, and ASCII_Name2 shown in FIG. 3 are each information that is exchanged between the access device 1 and the information recording device 2 as command arguments. The details of the various processing steps shown in this drawing will now be described through reference to FIGS. 4 to 7.

1.2.1. File Name Conversion Processing and File Transfer Request Processing

Figure 4:
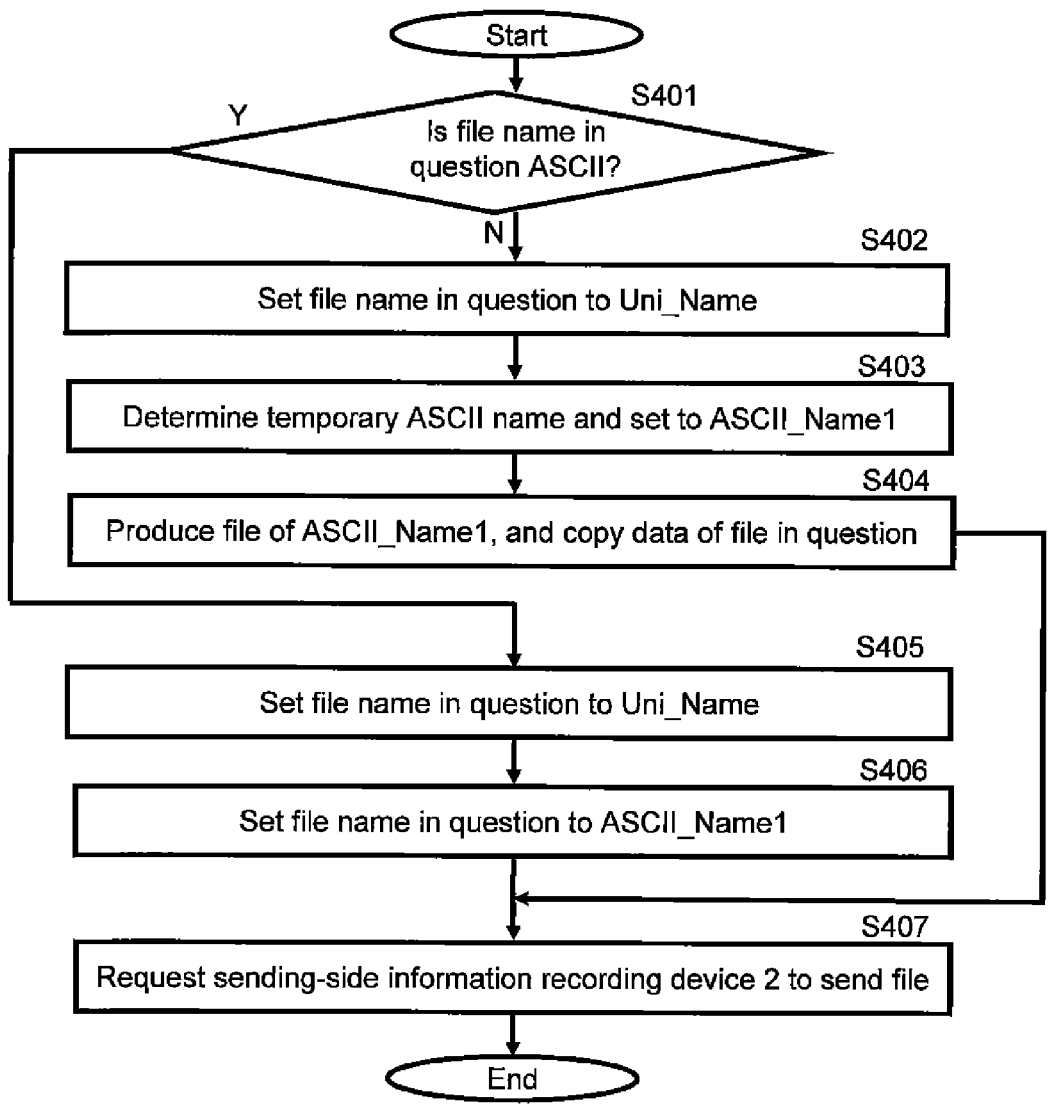
FIG. 4 is a flowchart of the order of file name share processing and the order of file transfer request processing with a sending-side access device in Embodiment 1.

First, the file name conversion processing and file transfer request processing in Embodiment 1 will be described through reference to FIG. 4. This processing is mainly performed by the sending-side access device 1 in FIG. 3. In particular, the file name conversion processing is performed by the file name conversion processor 104 of the host file system controller 102 in the sending-side access device 1.

Step S401: The file name conversion processor 104 determines whether or not the name of the file to be shared (the path name; an example of an inputted file name) is made up of only ASCII code (an example of a first character code) characters. If the file name in question is made up of ASCII code (an example of a first file name), the processing proceeds to step S405, and if a character code other than ASCII code is included, the processing proceeds to step S402.

Step S402: If it is determined in the processing of step S401 that the file name includes character code other than ASCII code, the file name conversion processor 104 converts the file name in question into Unicode (UFT-16; an example of a second character code), and sets the name to Uni_Name. For instance, when an FAT file system is used as the file system, and the original file name in question is stored as Shift-JIS, the file name conversion processor 104 in the sending-side access device 1 performs processing to convert the Shift_JIS file name into Unicode (UTF-16). For example, in the case of a file having the file name (path name) of "¥あいうえお.JPG," the character code is converted into Unicode (UTF-16) and the name is set to Uni_Name.

Step S403: The file name conversion processor 104 uses only ASCII code to produce a temporary name to be used for file transmission, and sets the name to ASCII_Name1. A name such as "¥TEMP¥UP_SRC.JPG," for example, is mechanically produced as a temporary name.

Step S404: The host file system controller 102 produces a file with the name of ASCII_Name1 determined in step S403, and copies the data of the file in question to the volatile memory 23 of the information recording device 2 via the information recording device access component 103. In the above example, a file with the name of "¥TEMP¥UP_SRC.JPG" is produced, and the file data of "¥あいうえお.JPG" is copied. The name of the file in question may also be changed directly to the name ASCII_Name1. In this case, the data of the file in question does not need to be copied to the file, so the processing can be carried out faster. Upon completion of the processing, the flow proceeds to step S407.

Step S405: If it is determined in the processing of step S401 that the file name is made up of only ASCII code, the host file system controller 102 converts the file name in question into Unicode (UTF-16) and sets the name to Uni_Name. In this case, the file name in question is made up of only ASCII code. Unicode (UTF-16) has upper compatibility with ASCII code, and character code within the ASCII range can be treated directly as ASCII code. Therefore, the conversion processing from ASCII code to Unicode (UTF-16) can be carried out by simple mechanical processing, regardless of the locale.

Step S406: The host file system controller 102 sets the file name in question to ASCII_Name1. In this case, since the file name in question is made up of only ASCII code, the file name in question is set directly to ASCII_Name1.

Step S407: The information recording device access component 103 designates Cont_Info indicating information related to the connection destination along with ASCII_Name1 and the Uni_Name corresponding to ASCII_Name1, and requests the transfer of a file to the sending-side information recording device 2. The ASCII_Name1 and Uni_Name are those described in the processing order discussed above. Cont_Info is information that is necessary for connection, such as a network key or the SSID of an access point, or identification information about the receiving-side information recording device 2' at the connection destination. In this embodiment, it is assumed that the wireless connection will be the same as those used in the past, so the information used for Cont_Info is also made up of the same information that has been used in the past, and will not be described in detail. Also, rather than conveying Cont_Info in this processing, it may instead be first conveyed from the sending-side access device 1 to the sending-side information recording device 2 as pre-processing for file sharing, and connection processing carried out ahead of time.

Although not depicted in the drawings, when file transfer processing is complete, the access device 1 receives a notification from the information recording device 2 to the effect that file transfer processing is complete, and this processing is ended.

1.2.2 File Detection/Connection Processing and File Transfer Processing

Figure 5:
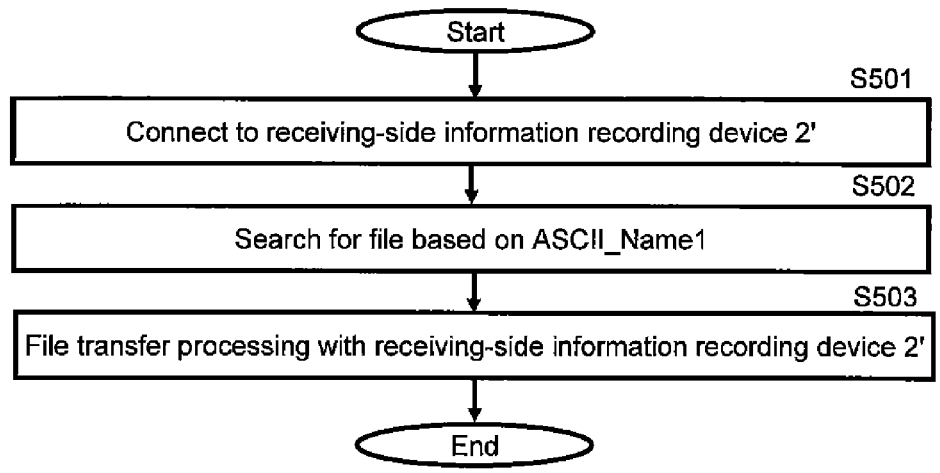
FIG. 5 is a flowchart of the order of file detection/connection processing and the order of file transfer processing with a sending-side information recording device in Embodiment 1.

Next, the file detection/connection processing and file transfer processing in this embodiment will be described through reference to FIG. 5. This processing is mainly carried out by the sending-side information recording device 2 in FIG. 3.

Step S501: Processing is performed to connect the sending-side information recording device 2 and the receiving-side information recording device 2'. As discussed above, in this embodiment it is assumed that the sending-side information recording device 2 and the receiving-side information recording device 2' are connected wirelessly. For example, it is also possible for the wireless connection in file sharing to be made along the connection guidelines set forth by DLNA (Digital Living Network Alliance). In this case, for example, file sharing can be performed by connecting the sending-side information recording device 2 as an M-DMS (mobile digital media server) and connecting the receiving-side information recording device 2' as an M-DMU (mobile digital media uploader).

Step S502: Using ASCII_Name1, the card file system controller 215 searches for the file in question and identifies data. Here, since ASCII_Name1 includes only ASCII code, the card file system controller 215 can search for files regardless of differences in character codes from one locale to the next.

Step S503: The data in the file identified in the search processing in step S502 is read by the card file system controller 215 and sent to the receiving-side information recording device 2'. Here, Uni_Name is conveyed to the receiving-side information recording device 2' as the name of the file corresponding to the read data. At this point, for example, if the wireless connection in file sharing is made according to the connection guidelines set forth by DLNA (Digital Living Network Alliance), it is possible to use Uni_Name as meta data indicating the content title. In this case, UTF-8 is used as the Unicode. Therefore, when UTF-16 is used as the Uni_Name, conversion to UTF-8 will be necessary. This conversion processing can be performed by mechanical conversion processing that does not rely on the locale, so this can be accomplished by either the sending-side access device 1 or the sending-side information recording device 2 ahead of time. Also, UTF-8 may be used as the Uni_Name from the outset. Furthermore, if there is a means for separately conveying the type of file (still picture, moving picture, etc.), then just a name (with the extension deleted from the file name) may be set for the Uni_Name.

Although not depicted in the drawings, when file transfer processing is complete, the sending-side information recording device 2 receives a notification from the receiving-side information recording device 2' to the effect that file transfer processing is complete, and ends the connection with the receiving-side information recording device 2', and also sends a notification to the access device 1 to the effect that file transfer processing is complete, and ends this processing.

1.2.3 File Production Processing

Figure 6:
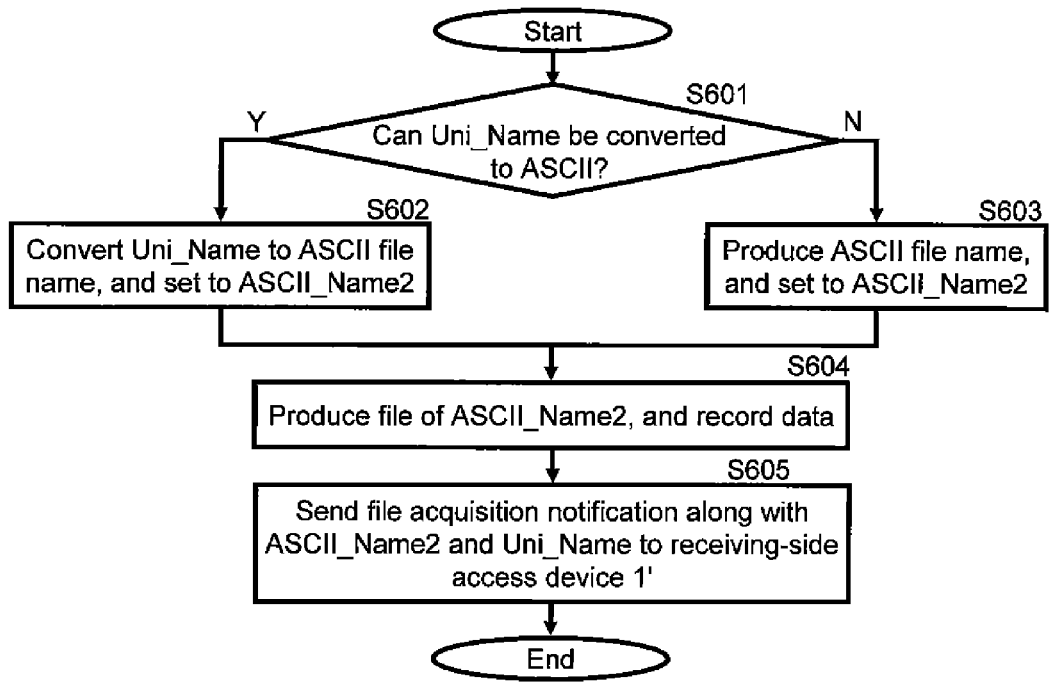
FIG. 6 is a flowchart of the order of file production processing with a receiving-side information recording device in Embodiment 1.

Next, the file production processing in this embodiment will be described through reference to FIG. 6. This processing is mainly carried out by the receiving-side information recording device 2' in FIG. 3.

Step S601: The card file system controller 215 determines whether or not the Uni_Name sent from the sending-side information recording device 2 is made up of only ASCII code and can be converted into an ASCII file name. If it can be converted into an ASCII file name, then the flow proceeds to the processing of step S602, and if it cannot be converted into an ASCII file name, then the flow proceeds to step S603.

Step S602: If it is determined in the processing of step S601 that conversion to an ASCII file name is possible, the card file system controller 215 converts the Uni_Name to an ASCII file name, and sets the name to ASCII_Name2. Since the Uni_Name here includes only ASCII code, the conversion can be carried out by simple mechanical processing that does not rely on the locale. Upon completion of the processing, the flow proceeds to step S604.

Step S603: If it is determined in the processing of step S601 that conversion to an ASCII file name is not possible, the card file system controller 215 uses only ASCII code to set a temporary name used for file reception, just as in step S403, and sets the name to ASCII_Name2. A name such as "¥TEMP¥UP_DST.JPG," for example, is mechanically produced as a temporary name. Upon completion of the processing, the flow proceeds to step S604.

Step S604: The card file system controller 215 produces a file with the name of ASCII_Name2 determined in step S602 or step S603, and records the received data to the same file by way of the volatile memory controller 22.

Step S605: The card file system controller 215 designates ASCII_Name2 and Uni_Name, and sends a file acquisition notification to the receiving-side access device 1' via the access device interface 211. This notification processing may be performed after the file has been recorded as in step S605, or may be performed before the file is recorded.

Although not depicted in the drawings, the receiving-side information recording device 2' sends the sending-side information recording device 2 a notification to the effect that file transfer is complete, ends the connection with the sending-side information recording device 2, and ends this processing.

1.2.4 File Name Restoration Processing

Figure 7:
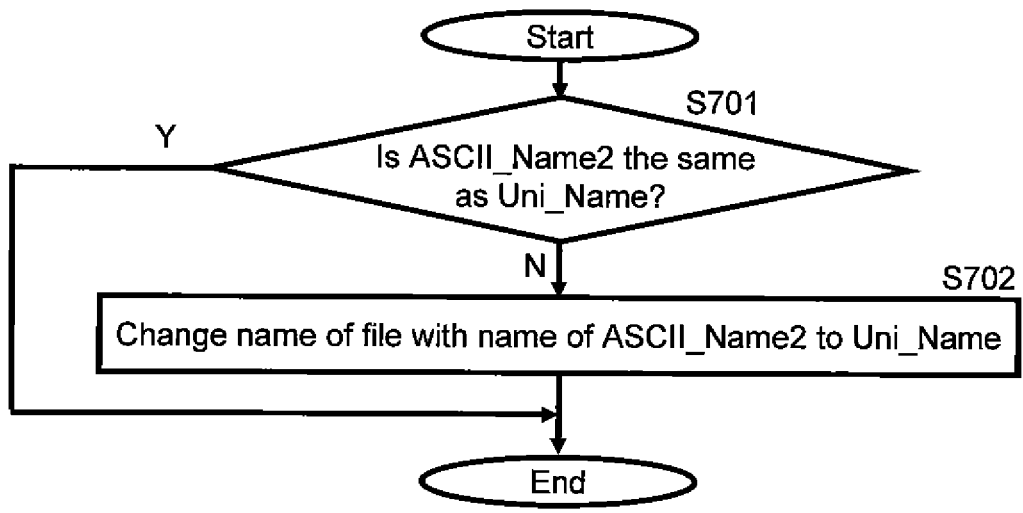
FIG. 7 is a flowchart of the order of file name restoration processing with a receiving-side access device in Embodiment 1.

Next, the file name restoration processing in this embodiment will be described through reference to FIG. 7. This processing is mainly carried out by the receiving-side access device 1' in FIG. 3.

Step S701: The host file system controller 102 determines whether or not the Uni_Name and the ASCII_Name2 sent from the receiving-side information recording device 2' are the same name. If the original file to be shared on the sending side had a file name that included just ASCII code, then file names in the same ASCII code are set for the ASCII_Name2 and the Uni_Name. If the original file to be shared had a file name including something other than ASCII code, then different file names are set for the ASCII_Name2 and the Uni_Name. In the former case, there is no need for file name restoration processing, so the processing is ended. In the latter case, the flow proceeds to the processing of step S702.

Step S702: The file name conversion processor 104 of the host file system controller 102 updates the file by converting the name of the file from ASCII_Name2 into Uni_Name. For example, when an FAT file system is used as the file system, and Shift-JIS is used to store character code other than ASCII code, processing is performed to convert the file name from the Unicode (UTF-16) of Uni_Name into Shift-JIS. For instance, in the case of the above example, the name "¥TEMP¥UP_DST.JPG" is changed to the name "¥あいうえお.JPG,"

By using a combination of the access device 1 and the information recording device 2 of this embodiment as discussed above, file sharing will not need operation for allowing compatibility with every locale on the information recording device 2 side, even when using a custom file name including a character code other than ASCII code.

1.3 Effect of Embodiment 1

The sending-side information recording device 2 pertaining to this embodiment identifies data to be transferred on the basis of a file name made up of ASCII code specified from the access device 1, and transfers the data in question and a file name formed by Unicode specified by the access device 1 to the receiving-side information recording device 2'. Consequently, even when a custom file name including a character code other than ASCII code is used, there is no need for the information recording device 2 to be capable of character code conversion processing for every locale. Therefore, since there is no need for compatibility with the character code in every locale where the information recording device 2 is sold, this capability does not have to be loaded on the information recording device 2, and the usage range of the information recording device 2 can be expanded. It is also possible to perform file sharing wirelessly between information recording devices using custom file names.

The sending-side access device 1 pertaining to this embodiment converts a custom file name including a character code other than ASCII code into a file name made up of only ASCII code, and requests file transfer to the information recording device 2. Therefore, file sharing can be performed wirelessly between information recording devices using custom file names.

The receiving-side information recording device 2' pertaining to this embodiment receives a custom file name including a character code other than ASCII code from the sending-side information recording device 2, produces a file having a file name in ASCII code, records data with this file name, and notifies the receiving-side access device 1' of this custom file name and the ASCII code file name. Therefore, file sharing can be performed wirelessly between information recording devices using custom file names.

The receiving-side access device 1' pertaining to this embodiment performs file name restoration processing on the basis of the ASCII code file name and the custom file name sent from the receiving-side information recording device 2'. Therefore, file sharing can be performed wirelessly between information recording devices using custom file names.

2. Embodiment 2

Figure 8:
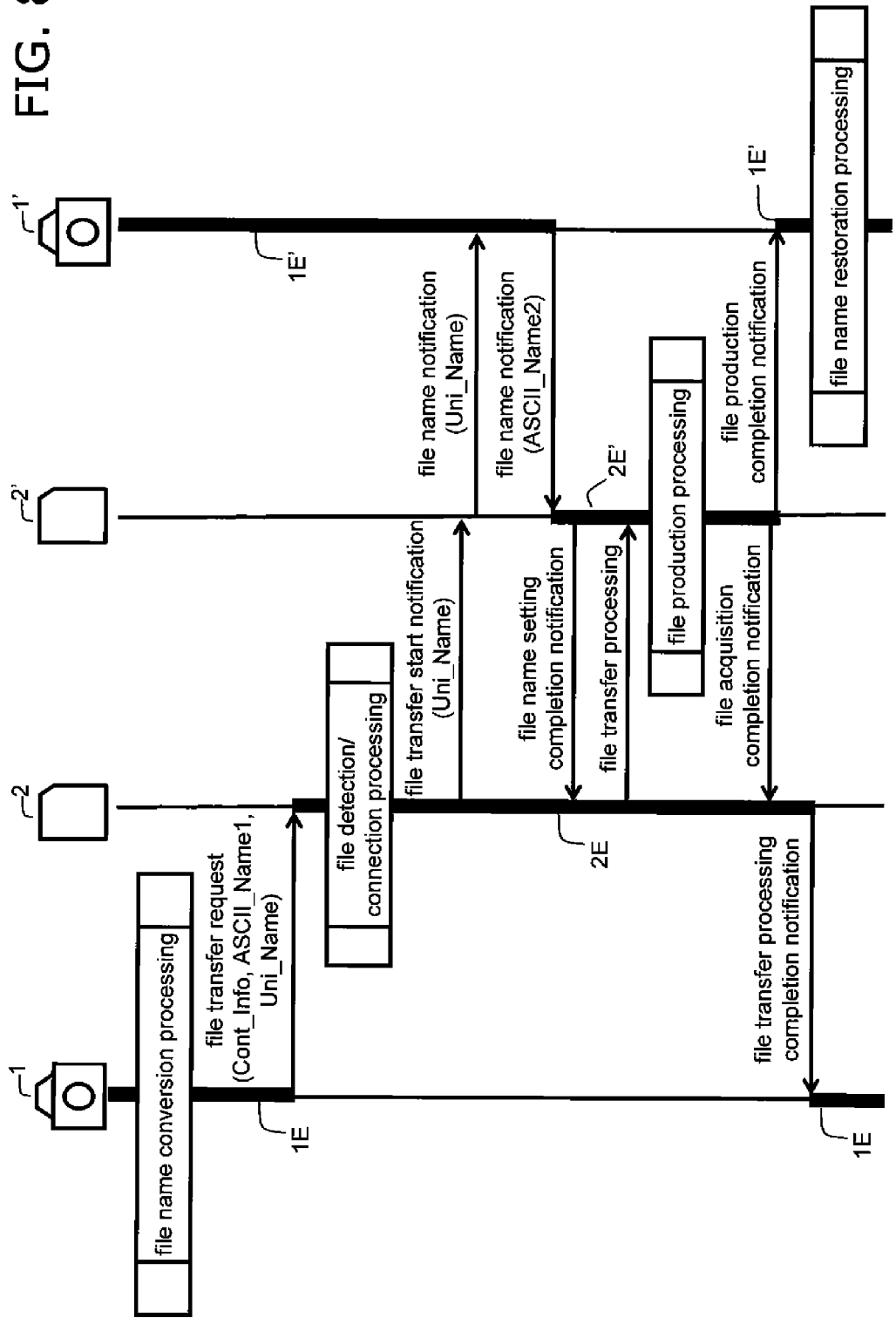
FIG. 8 is a diagram illustrating the file share processing sequence in Embodiment 2.

FIG. 8 is a diagram illustrating the file share processing sequence pertaining to Embodiment 2, which is an example of the present invention. The differences from Embodiment 1 will now be described, and those components and functions that are the same as in Embodiment 1 above will not be described again. Also, the configuration of the information recording system that performs file share processing in this embodiment is the same as that in Embodiment 1 shown in FIG. 1, so the same numbering will be used in the description. The various processing steps shown in FIG. 8 will now be described in detail through reference to FIGS. 9 to 11.

2.1 File Share Processing by the Information Recording System 100

As shown in FIG. 8, in this embodiment the receiving-side access device 1' determines the ASCII_Name2 name in processing on the receiving side. In this sequence, a Uni_Name is conveyed from the receiving-side information recording device 2' to the receiving-side access device 1' prior to file production processing, the decision about the ASCII_Name2 is made by the receiving-side access device 1', and this result is conveyed to the receiving-side information recording device 2'.

2.1.1 File Name Conversion Processing and File Transfer Request Processing

The file name conversion processing and file transfer request processing performed by the sending-side access device 1 are the same as in Embodiment 1 (FIG. 4), and therefore will not be described again.

2.1.2 File Detection/Connection Processing and File Transfer Processing

Figure 9:
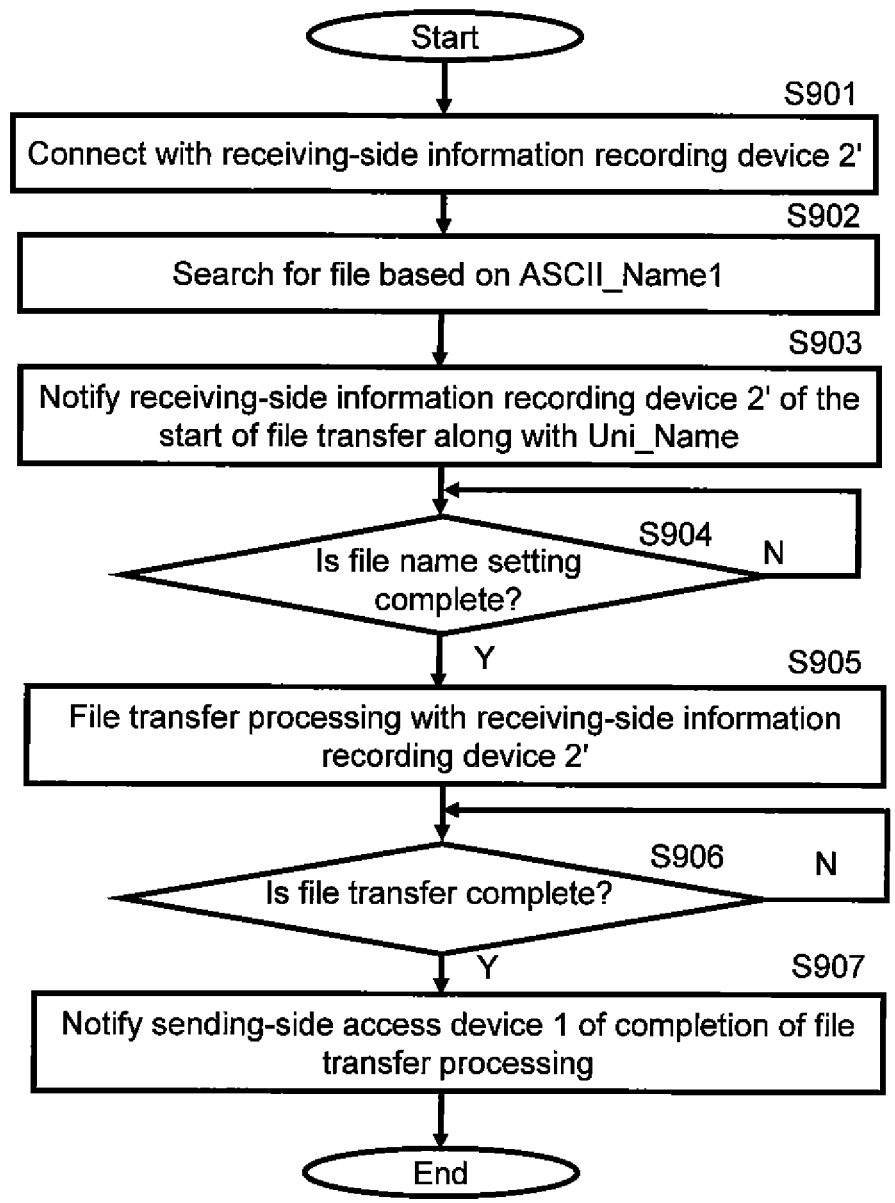
FIG. 9 is a flowchart of the order of file detection/connection processing and the order of file transfer processing with a sending-side information recording device in Embodiment 2.

Next, the file detection/connection processing and file transfer processing in this embodiment will be described through reference to FIG. 9. This processing is mainly carried out by the sending-side information recording device 2 in FIG. 3.

Step S901: Connection processing is performed between the sending-side information recording device 2 and the receiving-side information recording device 2'. This connection processing is the same as in Embodiment 1 (step S501 in FIG. 5).

Step S902: The card file system controller 215 uses ASCII_Name1 to search for the file in question, and identify the data. Here, since the ASCII_Name1 includes only ASCII code, the card file system controller 215 can search for the file regardless of any difference in character code due to the locale.

Step S903: The card file system controller 215 sends the receiving-side information recording device 2' a notification of the start of file transfer. A Uni_Name is conveyed to the receiving-side information recording device 2' here as the name of the file. At this point, for example, if the wireless connection in file sharing is made according to the connection guidelines set forth by DLNA (Digital Living Network Alliance), it is possible to use Uni_Name as meta data indicating the content title. In this case, UTF-8 is used as the Unicode. Therefore, when UTF-16 is used as the Uni_Name, conversion to UTF-8 will be necessary. This conversion processing can be performed by mechanical conversion processing that does not rely on the locale, so this can be accomplished by either the sending-side access device 1 or the sending-side information recording device 2 ahead of time. Also, UTF-8 may be used as the Uni_Name from the outset. Furthermore, if there is a means for separately conveying the type of file (still picture, moving picture, etc.), then just a name (with the extension deleted from the file name) may be set for the Uni_Name.

Step S904: The card file system controller 215 determines whether or not a notification to the effect that file name setting is complete has been received from the receiving-side information recording device 2' (discussed below).

Step S905: If a notification to the effect that file name setting is complete has been received from the receiving-side information recording device 2' in step S904, then the card file system controller 215 starts processing to transfer the file to the receiving-side information recording device 2'.

Step S906: The card file system controller 215 determines whether or not a notification to the effect that file transfer is complete has been received from the receiving-side information recording device 2'.

Step S907: If a notification to the effect that file transfer is complete has been received from the receiving-side information recording device 2' in step 906, the card file system controller 215 ends the connection with the receiving-side information recording device 2', sends the access device 1 a notification to the effect that file transfer processing is complete, and ends this processing.

2.1.3 File Production Processing

Next, file production processing in this embodiment will be described through reference to FIG. 10. This processing is mainly performed by the receiving-side information recording device 2' in FIG. 3.

Step S1001: First, the card file system controller 215 determines whether or not a notification of the start of file transfer has been received along with a file name of Uni_Name from the sending-side information recording device 2 (step S903 in FIG. 9).

Step S1002: If a notification of the start of file transfer has been received in step S1001 (step S903 in FIG. 9), the card file system controller 215 conveys a file name of Uni_Name to the receiving-side access device F.

Step S1003: The card file system controller 215 receives a file name ASCII_Name2 made up of only ASCII code, corresponding to the file name of Uni_Name conveyed in step S1002 from the receiving-side access device V.

Step S1004: The card file system controller 215 sends the sending-side information recording device 2 a file name setting completion notification.

Step S1005: File transfer is performed with the sending-side information recording device 2.

Step S1006: The card file system controller 215 produces a file with the file name ASCII_Name2 received in step S1003, and records the received data to this file by way of the volatile memory controller 22.

Step S1007: The card file system controller 215 sends a file transfer completion notification to the sending-side information recording device 2 via the wireless component 25, and ends the connection with the sending-side information recording device 2.

Step S1008: The card file system controller 215 sends a file acquisition notification to the receiving-side access device 1' via the access device interface 211.

2.1.4 File Name Setting Processing and File Name Restoration Processing

Next, the file production processing in this embodiment will be described through reference to FIG. 11. This processing is mainly performed by the host file system controller 102 of the receiving-side access device 1' in FIG. 3, and particularly by the file name conversion processor 104.

Step S1101: The file name conversion processor 104 receives a file name of Uni_Name from the receiving-side information recording device 2'.

Step S1102: The file name conversion processor 104 determines whether or not the received Uni_Name is made up of only ASCII code and can be converted to an ASCII file name. If conversion to an ASCII file name is possible, the flow proceeds to the processing of step S1103, and if conversion to an ASCII file name is impossible, the flow proceeds to the processing of step S1104.

Step S1103: If it was determined in the processing of step S1102 that conversion to an ASCII file name is possible, the file name conversion processor 104 converts the Uni_Name to an ASCII file name, and sets the name to ASCII_Name2. Since the Uni_Name here includes only ASCII code, mechanical conversion processing that does not rely on the locale can be performed.

Step S1104: If it was determined in the processing of step S1102 that conversion to an ASCII file name is impossible, the file name conversion processor 104 uses only ASCII code to determine a temporary name, and sets the name to ASCII_Name2. A name such as "¥TEMP¥UP_DST.JPG," for example, is produced mechanically as this temporary name.

Step S1105: The host file system controller 102 conveys the file name of ASCII_Name2 determined in step S1103 or S1104 through the information recording device interface 13 to the receiving-side information recording device 2' (step S1003 in FIG. 10).

Step S1106: The host file system controller 102 determines whether or not a file acquisition notification has been received from the receiving-side information recording device 2' (step S1008 in FIG. 10).

Step S1107: The file name conversion processor 104 performs file name restoration processing. This processing is the same as in Embodiment 1 (FIG. 7), and so will not be described again.

2.2 Effect of Embodiment 2

In the above embodiment, the following effect is achieved in addition to the effect produced by Embodiment 1. The receiving-side access device 1' determines the ASCII_Name2, and therefore, a file can be stored in a desired path of the receiving-side access device 1' that ultimately manages the file, and files can be easily managed in the receiving-side access device F.

2.3 Modification Example of Embodiment 2

In the sequence in FIG. 8, processing to produce a file may be added at the receiving-side access device 1' immediately prior to the file name notification (ASCII_Name2) by the receiving-side access device V. In this case, the "file production processing" in the receiving-side information recording device 2' includes only recording data in a produced file acquired from the receiving-side access device V. Doing this makes it possible to further reduce the processing load of the receiving-side information recording device 2'.

3. Embodiment 3

Figure 12:
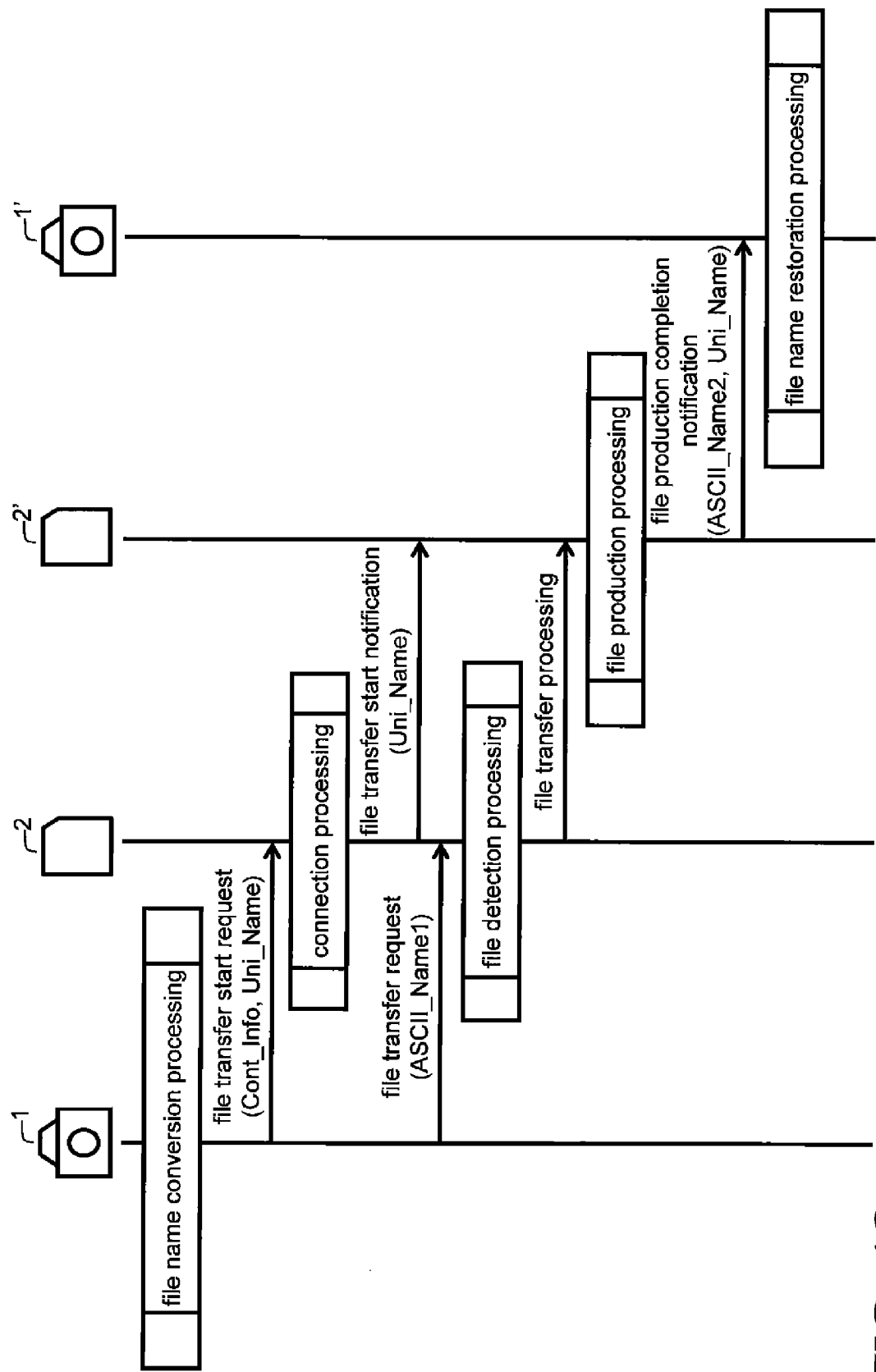
FIG. 12 is a diagram illustrating the file share processing sequence in Embodiment 3.

FIG. 12 is a diagram illustrating the file share processing sequence in Embodiment 3. The differences from Embodiment 1 will now be described, and those components and functions that are the same as in Embodiment 1 above will not be described again. Also, the configuration of the information recording system that performs file share processing in this embodiment is the same as that in Embodiment 1 shown in FIG. 1, so the same numbering will be used in the description.

The file share processing shown in FIG. 12 differs from that in Embodiment 1 above in the following respects. First, the sending-side access device 1 sends the sending-side information recording device 2 a file transfer start request along with Uni_Name and Cont_Info after performing file name conversion processing (the same as in steps S401 to S407 in FIG. 4). Upon receiving this, the sending-side information recording device 2 performs processing to connect with the receiving-side information recording device 2', and then sends a file transfer start notification to the receiving-side information recording device 2'. The sending-side access device 1 then sends the sending-side information recording device 2 a file transfer request along with ASCII_Name1. Upon receiving this, the sending-side information recording device 2 performs file detection processing, and sends the data of the identified file to the receiving-side information recording device 2' (the same as in steps S502 and S503 in FIG. 5). The rest of the processing by the receiving-side information recording device 2' and the receiving-side access device 1' is the same as in Embodiment 1.

As discussed above, in the above embodiment, Uni_Name is conveyed from the sending-side information recording device 2 to the receiving-side information recording device 2' prior to actual file transfer, with the actual file data being transferred only in file transfer processing, and there is no particular need to convey information about the Uni_Name. Thus, the Uni_Name notification timing is not limited to that in the sequence of FIG. 3, and the notification may be made at any timing so long as it is properly conveyed from the sending side to the receiving side.

4. Embodiment 4

Figure 13:
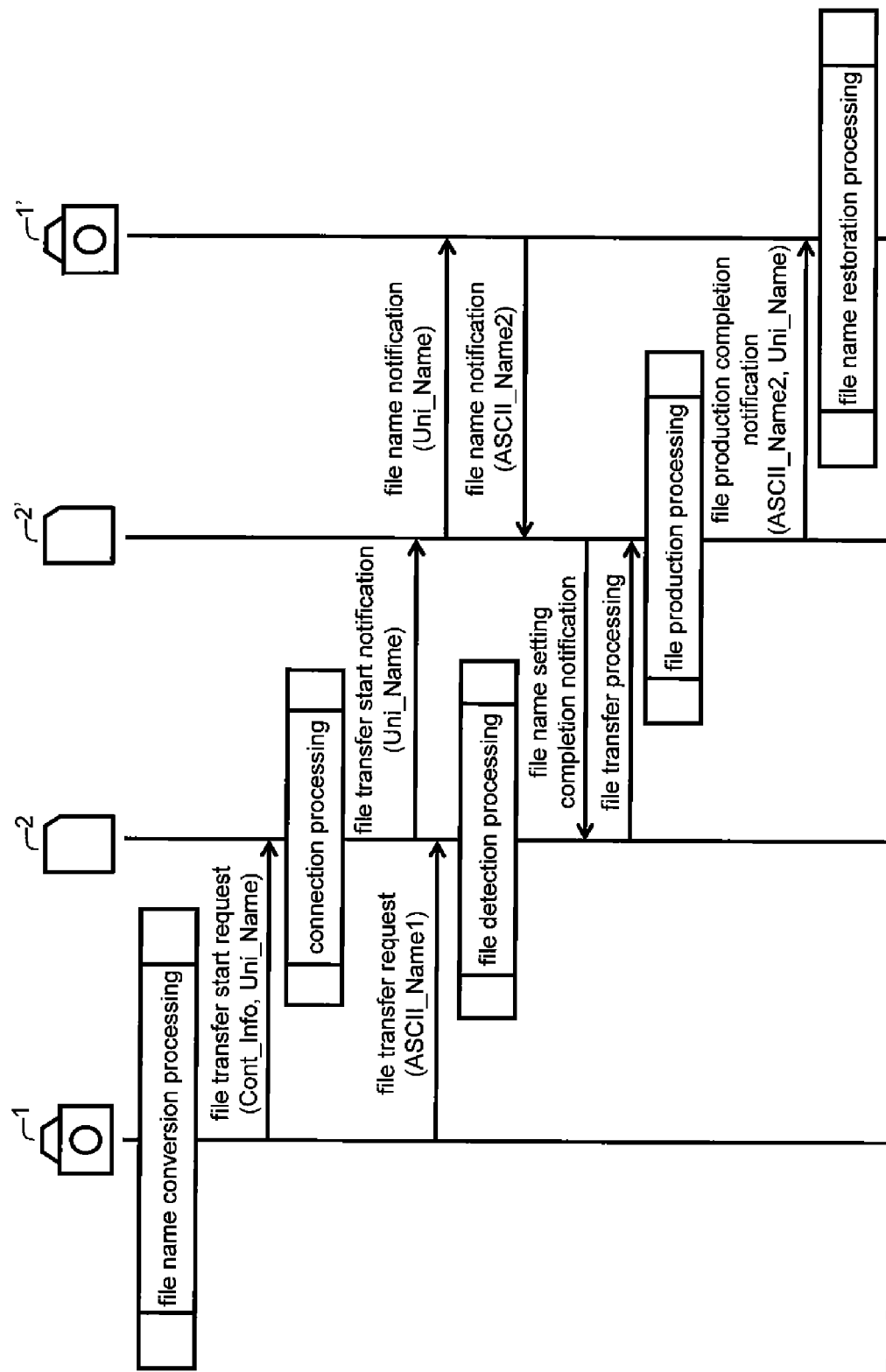
FIG. 13 is a diagram illustrating the file share processing sequence in Embodiment 4.

FIG. 13 is a diagram illustrating the file share processing sequence in Embodiment 4. The differences from Embodiment 3 will now be described, and those components and functions that are the same as in Embodiment 1 or 3 above will not be described again. Also, the configuration of the information recording system that performs file share processing in this embodiment is the same as that in Embodiment 1 shown in FIG. 1, so the same numbering will be used in the description.

This embodiment is different from Embodiment 3 in that the processing by the receiving-side information recording device 2' and the receiving-side access device 1', which is the same as in Embodiment 2, is applied. This is discussed in more specific terms below.

Figure 10:
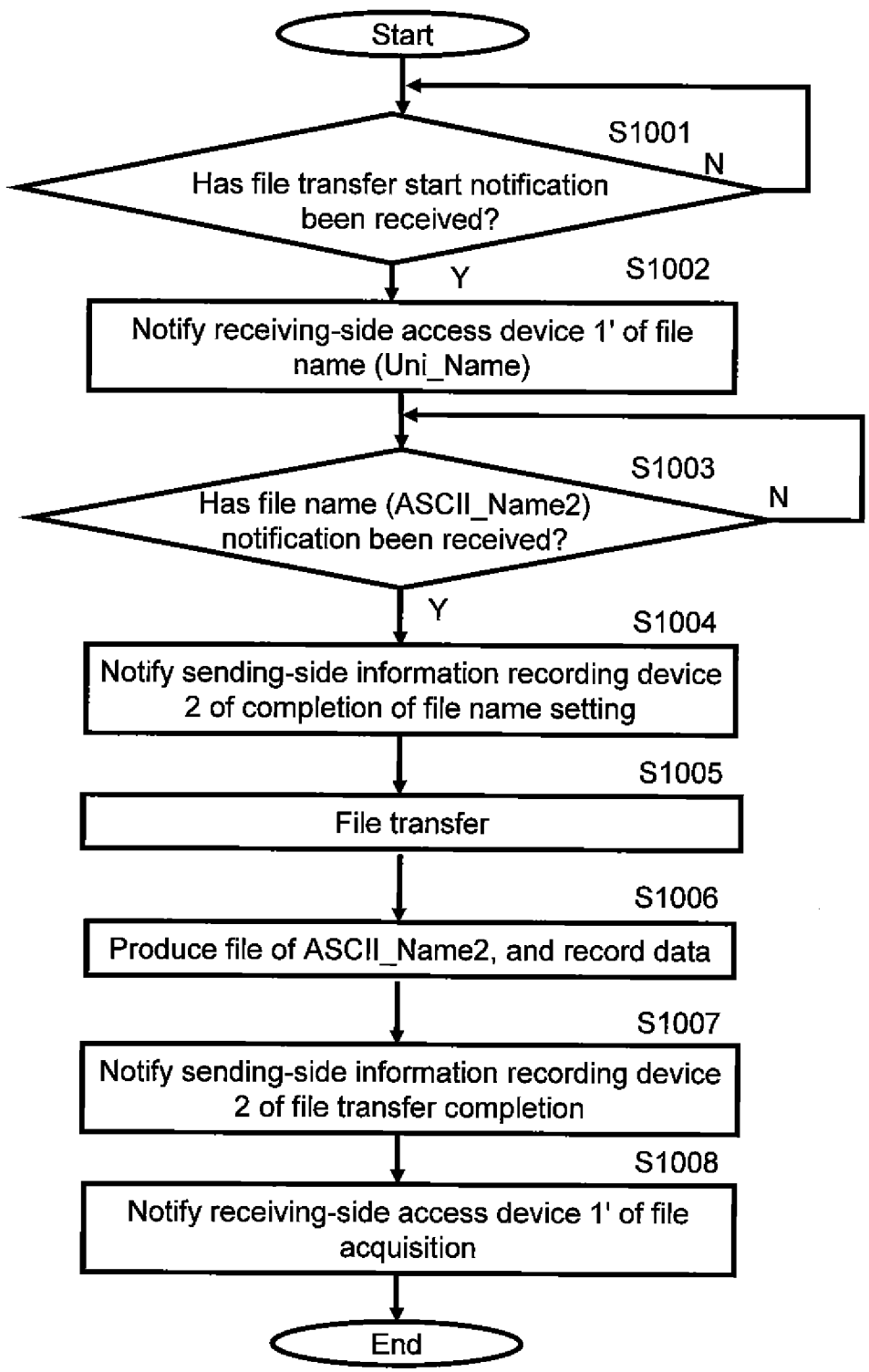
FIG. 10 is a flowchart of the order of file production processing with a receiving-side information recording device in Embodiment 2.

Upon receiving a file transfer start notification from the sending-side information recording device 2, the receiving-side information recording device 2' conveys a file name of Uni_Name to the receiving-side access device 1' (the same as in step S1002 in FIG. 10).

Figure 11:
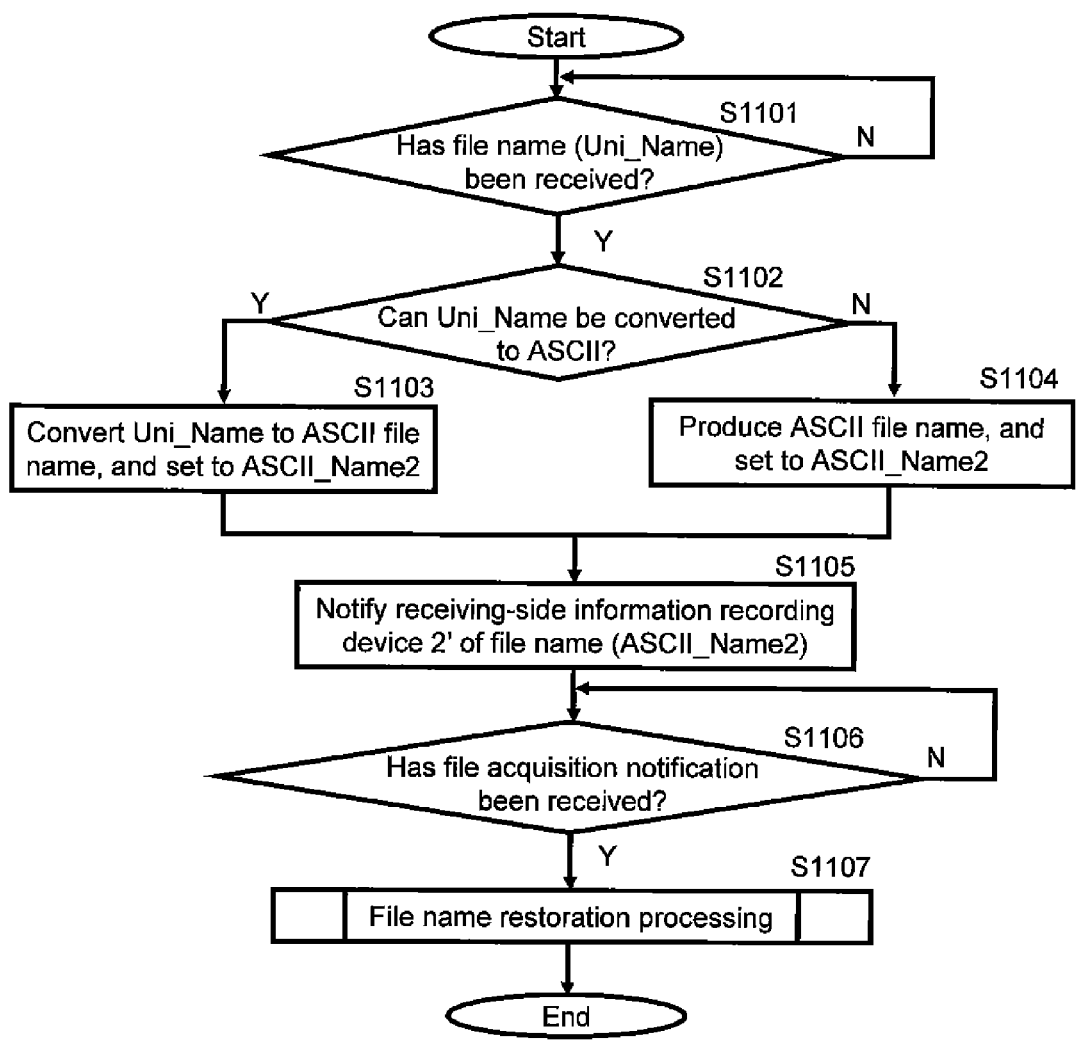
FIG. 11 is a flowchart of the order of file name determination processing and file name restoration processing with a receiving-side access device in Embodiment 2.

Upon receiving this, the receiving-side access device 1' performs file name setting processing, produces a file name of ASCII_Name2 made up of only ASCII code, and conveys this to the receiving-side information recording device 2' (steps S1101 to S1105 in FIG. 11). Upon receiving this, the receiving-side information recording device 2' conveys a file name setting completion notification to the sending-side information recording device 2. The sending-side information recording device 2 then performs file transfer, and the receiving-side information recording device 2' performs file production processing (the same as in step S1006 in FIG. 10). After this, the same processing as in Embodiment 2 is performed.

5. Embodiment 5

In Embodiments 1 to 4 above, in addition to the access device 1 (or access device 1') having the host file system controller 102 for performing file management with a file system, the information recording device 2 (or information recording device 2') also has the card file system controller 215 for managing the reading and writing of data by the file system. Therefore, exclusive control is performed so that mismatching of management information by the file system does not occur on either the access device 1 side or the information recording device 2 side.

An example of exclusive control will now be described through reference to the file share processing sequence of Embodiment 2 shown in FIG. 8.

As shown in FIG. 8, a processing period 1E of the sending-side access device 1 and a processing period 2E of the sending-side information recording device 2 are controlled so as not to overlap in operation. During the processing period 1E of the sending-side access device 1, operation of the card file system controller 215 of the sending-side information recording device 2 is prohibited. Meanwhile, during the processing period 2E of the sending-side information recording device 2, operation of the host file system controller 102 of the sending-side access device 1 is prohibited.

Exclusive control is similarly performed on a processing period 1E' of the receiving-side access device 1' and a processing period 2E' of the receiving-side information recording device 2'.

The above-mentioned exclusive control is performed by the host file system controller 102 of the access device 1 or 1', for example.

As discussed above, performing exclusive control over the operation of the controllers that control the file system in the access device and the information recording device effectively prevents the occurrence of mismatching of management information used by the file system.

Similarly, exclusive control can also be applied in Embodiments 1, 3, and 4. For instance, on the sending side, the card file system controller 215 of the information recording device 2 in Embodiment 1 (FIG. 3), Embodiment 3 (FIG. 12), and Embodiment 4 (FIG. 13) is controlled so as not to operate until receiving at least a file name of ASCII_Name1 from the access device 1. On the receiving side, the card file system controller 215 of the information recording device 2' in Embodiment 1 (FIG. 3) and Embodiment 3 (FIG. 12) is controlled so as not to operate until receiving at least a notification of the start of file transfer processing.

6. Other Embodiments

The order in which the processing steps are executed in the above embodiments is not necessarily limited to what was given in those embodiments, and the order may be switched around without departing from the gist of the invention. For example, the processing sequence in the above embodiments was described using the sequences in FIGS. 3, 8, 12, and 13, but some other sequence may be used instead. For instance, parts of these sequences may combined.

With the access device and information recording device described in the above embodiments, the various blocks may be individually made into a chip with an integrated circuit or other such semiconductor device, and a single chip may include some or all of these blocks. For example, with the configuration in FIG. 1, an example was given in which the information recording device 2 was constituted by three types of controller, namely, the main controller 21, the volatile memory controller 22, and the wireless controller 24, but these may be integrated into a single controller, or the volatile memory 23 and other constituent elements may also be integrated into a single controller, among other such chip configurations.

Also, the term "integrated circuit" was used herein, but other names are sometimes used, depending on the degree of integration, such as VLSI or ULSI.

Also, there are no particular restrictions on how the integrated circuit is produced, which may be accomplished with a dedicated circuit or a multipurpose processor. An FPGA (field programmable gate array), or a reconfigurable processor that allows settings or connections of circuit cells within an IC to be reconfigured may be utilized after IC manufacture.

Furthermore, if some new technique for circuit integration should debut through derivations or advances in semiconductor technology, then of course that technique may be used to integrate the functional blocks. The application of biotechnology and so forth is also conceivable.

The various processing steps in the above embodiments may be accomplished with hardware, or with software (including an OS (operating system), middle ware, or the use of a specific library). They may also be accomplished with a mixture of software and hardware. When the access device and the wireless information recording device pertaining to the above embodiments are realized with hardware, it should go without saying that the timing at which the various processing steps are carried out will need to be adjusted. In the above embodiments, for the sake of convenience in the description, the adjustment of the timing of the various signals resulting from actual hardware design is not discussed in detail.

Also, in the above embodiments a case was described in which the access device was separate from the information recording device with a wireless function, but this is not the only option, and the access device and the wireless information recording device may be constituted by a single device.

Also, in the above embodiments an example was described in which file share processing was performed with the wireless information recording device 2, but a conventional device may be used on either the sending side or the receiving side. For instance, when DLNA connection is used for file sharing, either a sending-side M-DMU or receiving-side M-DMS may be a conventional DLNA-conforming device. Also, the connection between the sending and receiving sides is not limited to DLNA, and any other connection method may be used as long as the original file name can be sent to the receiving side.

Also, the wireless information recording device 2 may have some other form besides that of a memory card, such as a USB memory, an external hard disk drive, or a built-in device.

The present invention can be worked not only as an information recording device, an access device, or an information recording system, but also as an information communication method.

INDUSTRIAL APPLICABILITY

The access device discussed above can be applied to any device that handles digital content such as moving or still pictures, and can be utilized as a movie camera, a digital still camera, a portable telephone terminal, a tablet terminal, a PC application, or the like. Also, the information recording device 2 with a wireless function can be utilized as a removable medium such as a USB memory or a memory card that holds the above-mentioned digital content, or as a built-in recording device.

REFERENCE SIGNS LIST 1, 1' access device
2, 2' information recording device with wireless function
11, 212 CPU
12, 213 RAM
13 information recording device interface
14, 214 ROM
21 main controller
22 volatile memory controller
23 volatile memory
24 wireless controller
25 wireless component
100 information recording system
101 application controller
102 host file system controller
103 information recording device access component
104 file name conversion processor
211 access device interface
215 card file system controller

The invention claimed is:

1. An information recording device, comprising:
a memory component configured to hold data;
a first file system controller configured to manage data held in the memory component on the basis of a file name formed by a first character code; and
a wireless component configured to send and receive wireless signals,
wherein
the memory component holds the data in a form of a file that is managed by an access device connected to the information recording device,
the first file system controller:
receives a first file name and a second file name from the access device with respect to a file recorded in the memory component, the first file name being formed by the first character code and having a specific file name, the second file name being produced from the specific file name and formed by a second character code;
identifies the file recorded in the memory component and managed by the access device on the basis of the first file name; and
sends the second file name and the data in the identified file to another information recording device connected via the wireless component.

2. The information recording device according to claim 1, wherein the first character code is ASCII code.

3. The information recording device according to claim 1, wherein the second character code is Unicode.

4. The information recording device according to claim 1, wherein the first file system controller sends the data in the identified file to the other information recording device only after sending the second file name to the other information recording device and then receiving a notification from the other information recording device indicating that a file name has been set.

5. The information recording device according to claim 1, wherein the first file system controller is controlled so as not to operate at least until acquiring the first file name.

6. An information recording device, comprising:
a memory component configured to hold data;
a first file system controller configured to manage data held in the memory component on the basis of a file name formed by a first character code; and
a wireless component configured to send and receive wireless signals,
wherein the first file system controller:
receives, from another information recording device connected via the wireless component, a second file name produced from a specific file name and formed by a second character code, and specific data corresponding to the second file name,
acquires a first file name formed by the first character code and having the specific file name,
produces a file having the first file name,
records the received specific data to the file having the first file name, and
sends the first file name and the second file name to an access device connected to the information recording device.

7. The information recording device according to claim 6, wherein the first character code is ASCII code.

8. The information recording device according to claim 6, wherein the second character code is Unicode.

9. The information recording device according to claim 6, wherein the second character code is interchangeable with the first character code, and
the first file system controller acquires a file name produced on the basis of the received second file name, as the first file name.

10. The information recording device according to claim 6, wherein the first file system controller acquires a file name formed by the first character code as the first file name regardless of the received second file name.

11. The information recording device according to claim 9, wherein the first file system controller acquires a file name produced by converting the first character code in the second file name, as the first file name.

12. The information recording device according to claim 6, wherein the first file system controller is controlled so as not to operate until receiving notification from the other information recording device of a start of sending of the specific data.

13. The information recording device according to claim 6, wherein the first file system controller is controlled so as not to operate until acquiring the first file name.

14. An information recording system, comprising:
the information recording device according to claim 1; and
an access device having a second file system controller connected to the information recording device and operable to manage data held in the memory component of the information recording device.

15. The information recording system according to claim 14, wherein the second file system controller of the access device is controlled so as not to operate while the first file system controller of the information recording device is operating.

16. The information recording system according to claim 14, wherein the second file system controller of the access device sets the first file name and the second file name on the basis of an inputted file name, and sends the first file name and the second file name to the information recording device.

17. The information recording system according to claim 14, wherein the second file system controller of the access device determines whether or not the first file name and the second file name are the same, and when the first file name and the second file name are not the same, changes the first file name to the second file name.

18. An information communication method using an information recording device having a memory component configured to hold data, a file system controller configured to manage data held in the memory component on the basis of a first file name formed by a first character code, and a wireless component configured to send and receive wireless signals,
wherein
the memory component holds the data in a form of a file that is managed by an access device connected to the information recording device,
the file system controller:
receives a first file name and a second file name from the access device with respect to a file recorded in the memory component, the first file name being formed by the first character code and having a specific file name, the second file name being produced from the specific file name and formed by a second character code;
identifies the file recorded in the memory component and managed by the access device on the basis of the first file name; and
sends the second file name and the data in the identified file to another information recording device connected via the wireless component.

19. An information communication method using an information recording device having a memory component configured to hold data, a file system controller configured to manage data held in the memory component on the basis of a file name formed by a first character code, and a wireless component configured to send and receive wireless signals,
wherein the file system controller:
receives, from another information recording device connected via the wireless component, a second file name produced from a specific file name and formed by a second character code, and specific data corresponding to the second file name,
acquires a first file name formed by the first character code and having the specific file name,
produces a file having the first file name,
records the received specific data to a file having the first file name, and
sends the first file name and the second file name to an access device connected to the information recording device.

* * * * *